United States Patent [19]

Hartmeister

[11] Patent Number: 4,998,351
[45] Date of Patent: Mar. 12, 1991

[54] POWER DRIVEN HAND TOOL ASSEMBLY

[76] Inventor: Ruben J. Hartmeister, 1034 6th St., Golden, Colo. 80403

[21] Appl. No.: 366,776

[22] Filed: Jun. 14, 1989

[51] Int. Cl.⁵ .............................................. B26B 15/00
[52] U.S. Cl. ...................................... 30/228; 30/180; 72/409
[58] Field of Search .................. 30/228, 180, 191, 272, 30/249; 72/409, 453.16; 81/301

[56] References Cited

U.S. PATENT DOCUMENTS

| | | |
|---|---|---|
| 2,869,407 | 1/1959 | Swanson . |
| 3,267,573 | 8/1966 | Hill .......................................... 30/228 |
| 3,626,445 | 12/1971 | Penix ................................. 30/228 X |
| 3,854,204 | 12/1974 | Gonzales, Jr. ......................... 30/228 |
| 4,136,549 | 1/1979 | Lytle et al. . |
| 4,458,418 | 7/1984 | McSmith et al. . |

Primary Examiner—Frank T. Yost
Assistant Examiner—Willmon Fridie, Jr.
Attorney, Agent, or Firm—Kyle W. Rost

[57] ABSTRACT

A motor drives a hydraulic pump having a sealed fluid system with positively pressurized fluid reservoir. A tool head connected to the hydraulic pump has first and second shearing jaws, each with a respective a cutting edge and a workpiece seat. The first jaw is pivotally mounted to swing its cutting edge past the second cutting edge. A cushioning device carried by the second jaw is in the path of the first workpiece seat and retains the sheared portion of the workpiece.

15 Claims, 3 Drawing Sheets

POWER DRIVEN HAND TOOL ASSEMBLY

FIELD OF THE INVENTION

The invention generally relates to metal deforming with cutting, and more especially to severing a discrete piece from stock, work, or product. The invention also generally relates to tools and cutlery, as well as to surgery. A power driven hydraulic hand tool is disclosed, which is capable of hydraulic operation without surrounding air pressure and is capable of cutting extremely tough metal rods by the action of a single pivoting jaw acting against a stationary jaw.

DESCRIPTION OF THE PRIOR ART

In the area of hand tools, there are a number of hydraulic compression tools, crimping tools, and cutters. For example, the Burndy Corporation of Norwalk, Conn., provides a hydraulic hand tool known as the Y35. This tool employs a lever handle to pump-up a hydraulic reservoir, thereby advancing a moving die against a stationary die. U.S. Pat. No. 2,869,407 to Swanson discloses what is believed to be this same tool. The purpose of the tool is to crimp a splicing connector over the ends of spliced electrical cables. A number of other hydraulic crimping devices are known, which work in approximately the same way. U.S. Pat. No. 4,136,549 to Lytle et al discloses another tool for securing electrical connectors. A hydraulic cutter is disclosed in U.S. Pat. No. 4,458,418 to McSmith et al. All of these tools are believed to adequately perform their normal, intended functions.

These known hand tools require that the hydraulic reservoir be pumped-up by movement of a lever. This type of activation is quite acceptable for the typical mechanical job, despite the jiggling that may be transmitted to the workpiece. However, there are situations in which excess motion is destructive and should be avoided. One such job arises when surgeons repair scoliosis of the spine. This operation involves fastening elongated steel rods along the line of the vertebrae. The rods are secured to the vertebrae by being clamped to screws or studs, which are screwed into the bone of the vertebrae. Then, plates are clamped to the studs with nuts. Since it is not known in advance how far each stud will enter the bone before becoming secure, the studs are overly long and must cut to proper length after installation. In performing the cutting procedure, the surgeon wishes to avoid any unnecessary force that might loosen the stud. Thus, a tool that gradually closes its jaws by repeated pumping is ill-suited for use in this operation. The present day standard method for cutting these studs is by the use of lever action bolt cutters. It would be desirable to have a power driven tool for this purpose.

Another problem arising from the use of prior known cutting tools, including lever action bolt cutters, is that the cut end of the stud has a residual sharp, wedge-shaped end extending above the tightened nut. In the scoliosis correction operation as described above, this sharp end cannot be removed, since any sort of grinding or filing would both disturb the anchoring of the stud and contaminate the open incision. Thus, for lack of an adequate technique and tool, surgeons must allow the sharp-ended studs to remain permanently in the patient. It is reported that these sharp ends can puncture their way out of the skin, causing damage to clothing and furniture. Unquestionably, this problem has attracted considerable attention, but no satisfactory solution is known. It would be desirable to have a tool capable of cutting such studs and leaving behind a fairly flat end.

The preferred location for cutting the excess portion of the studs is immediately at the outer face of the nut. However, no known tool can accomplish this task in the operating room environment. Any pincer action tool, such as a conventional bolt cutter, inevitably will leave behind a sharp end on the stud, extending outwardly from the nut. Also, it would be difficult to accurately locate the cutter blades on a pincer action tool to operate at the outer face of the nut. It would be desirable to have a tool that is capable of cutting the stud end at a level with the outer face of the nut.

Still another problem with prior known cutters, as related to the surgical problem mentioned above, is that they are not capable of cutting metal that is as hard and tough as the steel used in the surgical studs. The hand held bolt cutters that now are used are of very large variety, and are physically challenging to hold steady and manipulate. It would be desirable to have a power driven hand tool that is capable of cutting the toughest steel and doing so without requiring extensive physical manipulation.

The hydraulically operated, hand held cutters and crimpers of the prior art have a further limitation, in that they are dependent upon the presence of atmospheric pressure, or at least a surrounding gas pressure, to enable the hydraulic systems to operate. It is believed that hand held, hydraulically operated tools will be desirable for use in situations where the tool may be in a substantial vacuum, such as in space. Similarly, such a tool may be desirable for use in situations having high pressure, such as in a deep sea environment, in high pressure atmospheres, or in steam sterilization chambers. It would be desirable to have a hydraulic hand tool that does not require the presence of a surrounding atmosphere for its operation, and similarly, that is sealed against exchange of any fluid with any surrounding fluid atmosphere, so that the tool will not become internally contaminated and can be sterilized.

To achieve the foregoing and other objects and in accordance with the purpose of the present invention, as embodied and broadly described herein, the power driven hydraulic hand tool assembly of this invention may comprise the following.

SUMMARY OF THE INVENTION

Against the described background, it is therefore a general object of the invention to provide an improved hydraulic hand tool assembly that is power actuated.

Another object is to provide a hydraulic hand tool assembly that does not require the presence of a surrounding atmosphere for proper hydraulic operation.

A further object is to provide a cutting tool that is capable of severing a metal stud having the hardness of a surgical steel and leaving a flat severed end.

Still another object is to provide a cutter that is capable of severing even tough metal studs in a single, smooth action, so as to avoid jiggling the stud or applying any substantial shocks to it.

A further important object is to provide a self-contained tool having all of the above-stated features.

Additional objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

According to the invention, a power driven hand tool assembly includes a motor means for providing rotational motion; a reservoir containing fluid and having an internal pressure source urging the fluid to move out of the reservoir; a power cylinder containing a power piston that is moveable in first and second directions within the cylinder; a pump means having fluid contained therein, joined to the motor means for receiving the rotational motion therefrom and in response thereto imparting a condition of alternating relatively increased and decreased pressure to the fluid contained in the pump means; a valve means in communication with the fluid contained in the pump means for discharging a portion thereof in substantially one directional flow to the power cylinder on a first side of the power piston in response to a relative fluid pressure increase, and thereby moving the power piston in the first direction within the power cylinder; and said valve means in communication with the reservoir for receiving fluid therefrom in substantially one directional flow in response to a relative pressure decrease in the fluid contained in the pump means.

According to a further aspect of the invention, a power driven hand tool assembly includes a hydraulic pump; a motor means for driving the hydraulic pump; a piston in a cylinder having fluid connection with the hydraulic pump and moveable in a first direction within the cylinder by the action of the hydraulic pump; and a tool head connected to the hydraulic pump and having first and second jaws, the first being relatively moveable with respect to the second, and the second being relatively nonmovable with respect to the pump body; wherein the first jaw is pivotally mounted to the tool head and has operative connection with the piston, such that the first jaw is pivotally moved toward the second jaw in response to movement of the piston in the first direction.

The tool head may have interchangeable jaw elements so that the hand tool assembly is capable of performing different required functions.

The accompanying drawings, which are incorporated in and form a part of the specification illustrate preferred embodiments of the present invention, and together with the description, serve to explain the principles of the invention. In the drawings:

DESCRIPTION OF THE PREFERRED EMBODIMENTS

The invention is a self-contained, power driven, hydraulically actuated tool or instrument that is capable of applying powerful forces with a minimum of external pressure applied by the operator, with the result that the operation of the tool does not affect the position of the workpiece. In particular, the instrument is free from tendencies to twist, tilt, or vibrate when work is performed. The self-contained nature of the tool significantly contributes to such a result.

Figure 1:
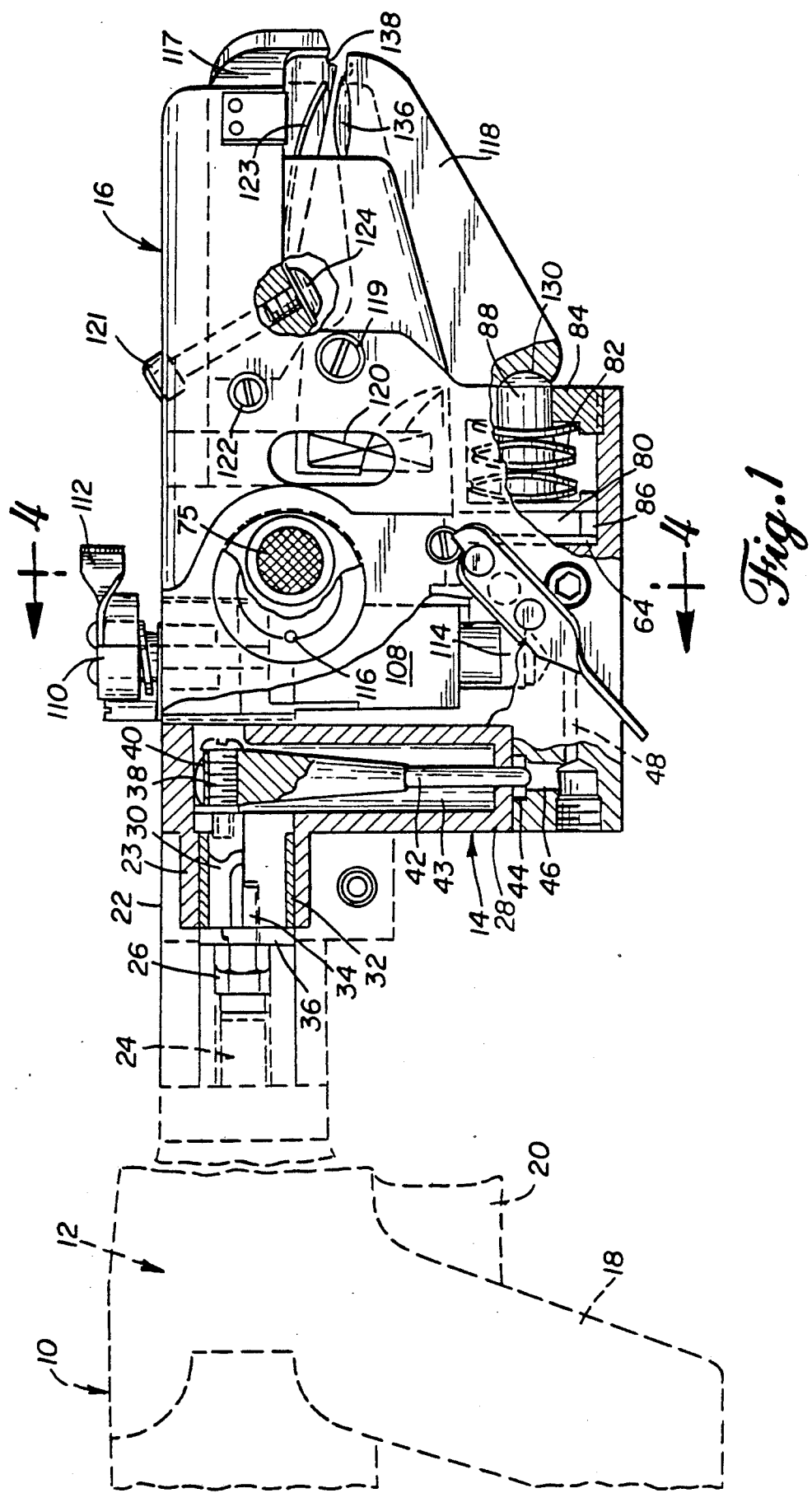
FIG. 1 is a side elevational view of the power driven hydraulic hand tool assembly, with the skin of the hydraulic mechanism cut away to show the interior components and with additional interior structure shown in phantom.

With reference to FIG. 1, the tool 10 includes two primary subassemblies, a motor means subassembly 12 and a pump subassembly 14. The motor means is for providing driving, work force to the pump subassembly and may be a motor powered by any suitable source; for example, by alternating current, direct (battery) current, compressed air, or hydraulics. The pump subassembly is for receiving the output from the motor means and converting it into a working load. The work force supplied by the motor means is converted by pump action, such as in a hydraulic pump, into high pressure on a large working piston, producing, for example, up to five tons of working load, depending upon the area of the piston. Notwithstanding that the force is large, the distance traveled by the piston is a minimum, but enough to operate a tool head and thereby perform the required job.

A third but variable subassembly is the tool head 16, which in the embodiment of FIG. 1 is physically unified with a hydraulic pump body of the pump subsystem. This tool head is a cutter especially suited for use on surgical steel studs and rods, which, as previously noted, are extremely difficult to cut. However, tool heads of other designs may be used in order to adapt this tool for further and different purposes. For example, this tool could be converted for use as a crimper or punch by substitution of appropriate tool heads or jaws.

With general reference to FIG. 1 of the drawings, the preferred motor means 12 is electric, powered by rechargeable batteries. A number of suitable motor assemblies are commercially available and are sold as rechargeable drills. Thus, the motor means may be a drill body having a pistol grip handle 18 with an activating trigger 20, which together allow the tool 10 to be held steadily by hand and to be activated with minimal jiggling, jarring, or other motion. The drill motor is joined to the hydraulic pump subassembly by a coupling means that both creates a stable physical union between the two subassemblies and transmits the rotational motion of the motor's shaft to the pump. For example, a drive motor coupling 22 may join the two subassemblies by being clamped in place by a set screw on a nose 23 of the pump subassembly. Other types of threaded, clamping, or locking mechanisms may perform the joining function.

Power from the drill motor is output to the hydraulic pump subassembly along motor shaft 24, which may be carry on its end a male/female mating system such as a hexagonal shaft or socket 26, which is capable of engaging a corresponding hexagonal socket or shaft of the pump assembly, as described below. The motor means and pump may be uncoupled at coupling 22 for ease of cleaning and service, to enable separate sterilization of the pump, as well as to enable prompt removal and replacement of the rechargeable motor means.

The pump subassembly 14 is housed in a pump body 28, which is supported from the drill body the coupling. In addition, the pump body may include one or more handles or finger grips 29 to supplement the pistol grip handle 18 by providing a more forwardly located holding point and allowing two-handed support.

The pump body contains a pump mechanism, which is initially described by reference to FIG. 1. The pump mechanism has a power stroke during which the motor means is in operation. A cylindrical crankshaft portion 30 is carried by the pump body in nose 23, in a cylindrical bushing 32 for rotation with the motor shaft 24. The crankshaft portion 30 is jointed to the motor shaft by a suitable coupling as described above. For example, a hexagonal head cap screw 34 may be engaged in the rear face of the crankshaft portion 30, substantially along a centerline axis of portion 30, and against a thrust washer 36. Rotation of the motor is transmitted to the hexagonal screw head by engagement with the socket 26. At an off-center location relative to the centerline of the cap screw and portion 30, the front face of crankshaft portion 30 carries a shoulder screw 38, which constitutes an offset throw portion of the crankshaft structure. The screw 38 is received in a piston rod bushing 40. A piston rod 42 houses the bushing 40 near it supper end as viewed in FIG. 1. Whent he motor means is in operation, the piston rod is caused to reciprocate within a pump cavity 43 by the orbiting motion of the screw 38 about the central axis of the crankshaft portion 30.

While the crankshaft diretly reciprocates the above-described piston rod, alternte driving arrangemetns may perform the same function. The described piston rod has a side-to-side motion caused by the orbiting action of crank throw 38. This lateral motion may be avoided by eliminating the direct journal to the crankshaft. The top end of the piston rod may be mounted in a sliding guide that restricts lateal motion, and the piston may be spring biased upwardly in cavity 43 against the guide. Then, the crankshaft throw 38 may act as a roller cam, operating against the guide to push down the piston and the guide against spring pressure and allowing the spring pressure to raise the piston rod when the throw 38 is lifted. Thus, the piston rod may be driven in a variety of ways, any of which will operate the pump.

Continuing with the power stroke of the hydraulic system, the lower end of the piston rod, as viewed in FIG. 1, passes through a "U" cup seal 44 in an oill filled chamber 46 of the oil circuit, where the down stroke or pressure stroke of the piston rod tends to expel oil from the chamber, and the up stroke or suction stroke tends to draw back the oil. This reciprocating flow of oil in the power stroke circuit continues through oil passge 48, which connects chamber 46 to the pump valve at chamber 50 of FIG. 4.

The pump mechanism thus consists of two moving parts: the crankshaft and the piston rod. In the embodiment of the drawings, this mechanism is located near the end of the pump body. Oil passage 48 extends forwardly from chamber 46 to the remainign parts of the pump. in the drawings, the pump body is hsown to be a single unit that is shaped as a generlaly vertical, upstanding block. If the configuration of the pump body is preferred to be laterally angled with respect to the pistol grip handle, the body can be redesigned to dispose the portions forward of chamber 46 at any desired angle, using the longitudinal axis of oil passge 48 as a pivot asix.

Figure 3:
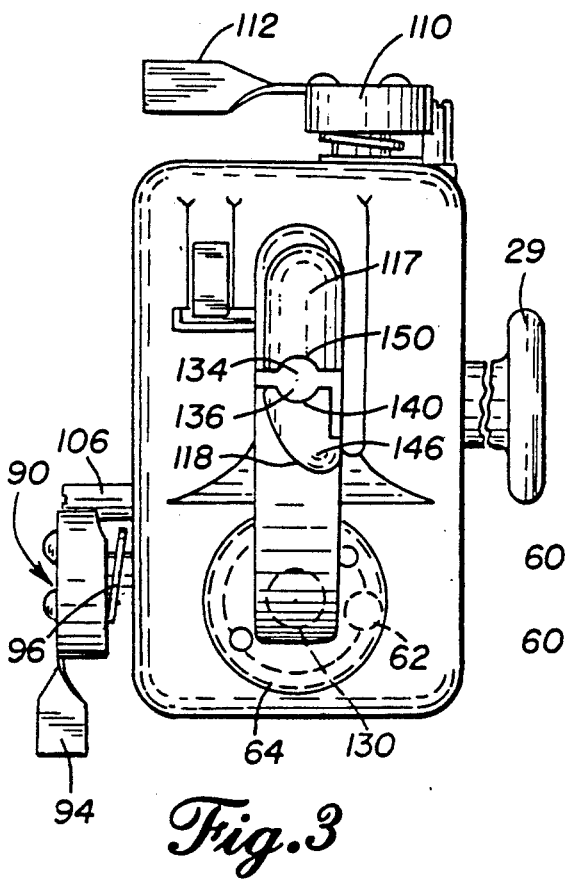
FIG. 3 is a front elevational view of the hydraulic mechanism, showing interior structure in phantom.
Figure 4:
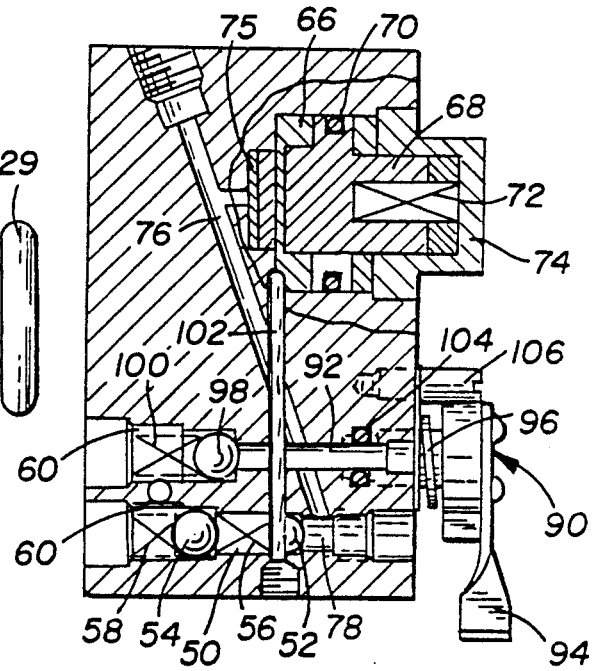
FIG. 4 is a vertical, transverse cross-sectional view taken along the plane of line 4—4 of FIG. 1, and showing portions of the interior cut away.

With reference to FIG. 4, the reciprocating action of the piston rod supplies a positive flow of oil to the power cylinder. The chamber 50 is bounded by check balls 52 and 54, which together constitute the pump valve. Ball 52 is spring loaded by check spring 56 to open into chamber 50. Thus, on the suction stroke, the piston rod draws oil past ball 52 into chamber 50 to permit refill of chamber 46. Ball 54 is spring loaded by check spring 58 to move away from chamber 50 into chamber 60. Thus, on the pressure storke, the piston rod moves oil out of chamber 50 and into chamber 60. As shown in FIG. 3, a port 62 conects chamber 60 to the power cylinder 64. Each pressure stroke of th episton rod will, therefore, move a quantity of oil into the power cylinder.

With furtehr reference to FIG. 4, reservoir oil is supplied to the pump mechanism under positive pressure. The hydraulic oil is suplied from a reservoir 66. Int he reservoir is a reservoir piston 68 sealed against the reservoir side wall by an "O" ring seal 70. The piston is spring loaded against the oil supply by a sprign 72 of, for example, thirty pounds, acting between the rear face of the piston and the reservoir cap 74. Thus, the oil supply to the pump mechanism is spring-pressurized and does not require outside pressure, such as atmospheric pressure, for proper operation of the pump. Oil from the reservoir is supplied through a screen 75 via passage 76 to chamber 78, which is separated from chamber 50 by check ball 52. On each suction stroke of the piston rod, a quantity of oil is removed from the reservoir and supplied to the power stroke circuit. The reciprocating piston rod can supply a volume of oil through the described power stroke circuit from the reservoir to the power cylinder equal to the displaceable oil capacity of the reservoir.

With reference to FIGS. 1 and 3, the power cylinder 64 contains the power piston 80, which is. spring loaded toward the fluid side of the cylinder by a resilient mechanism, preferred to be formed of a series of dished, alternatately facing spring washers 82, together forming a piston spring and acting between the head of the piston and the piston ring stop 84. The piston is sealed against loss of hydraulic oil by "U" 38 cup seal 86. As oil fills the power cylinder, the forward nose 88 of the piston protrudes from the piston ring stop and is applied to the tool head in order to perform the desired work function. With the extension of the piston nose to whatever length is desired, the power stroke is complete.

With the completion of the power stroke, the power piston 80 must be retracted and oil returned to the reservoir for the next cycle of operation. For this purpose, a valve release assembly 90 operates a release plunger 92. The valve release trigger 94 is spring loaded to a closed position by return spring 96. Also, a return check ball 98, which communicates with chamber 60, is spring loaded to closed position by check spring 100. The valve can be opened by rotating the release trigger against the return spring, causing the release plunger to move check ball 98 into open position against spring 100. When the valve is open, chamber 60 is in communication with passages 102, leading into the fluid side of the reservoir 66. A portion of passage 102 houses the release plunger, which is sealed to the atmosphere by an "O" ring seal 104. The piston spring washers 82 provide a positive return force, for example one hundred fifty pounds, against the power piston, driving it toward the oil side of the power cylinder. Oil returns to the reservoir from the power cylinder by being driven through port 62 into chamber 60 and then to the reservoir via return passages 102. The reservoir piston is driven back against the pressure of the reservoir spring due to the greater relative spring force of the piston spring washers. The release plunger and check ball 98 return to closed position under the pressure of their return springs when the release trigger is free. A stop pin 106 is provided to catch the release trigger on its return to closed position.

A regulator safety valve system, or overload valve, is provided to prevent catestrophic failure of the pump system, such as if pressure were to reach such a high level that the tool would destroy itself. For this purpose, a high pressure valve assembly 108, FIG. 1, is mounted in the pump body. This assembly is a commercially available item and constitutes a regulator valve having a spring-loaded check ball in a housing. The regulator valve is controlled by a regulator base 110 that selectively sets the valve's release pressure according to the position of an adjustment lever 112, which varies the pressure of the release spring in the valve. The preferred regulator valve offers adjustment to a maximum pressure of 10,000 pounds, but also may be set to lower release pressures such as 500, 1000, or 5000 pounds. The pump body cavity 114 in which the regulator valve is mounted communicates with cavity 60, which at all times in communication with the oil side of the power cylinder. When oil pressure exceeds the preselected level, the valve opens, the oil bleeds past the valve and returns to the oil reservoir via port 116. The regulator valve then closes at approximately zero pressure. Consequently, the pump cannot pressurize the power piston to such a degree as to cause a catestroohic failure.

The entire hydraulic system is sealed against atmosphere and outside contamination. The tool may be sterilized at steam pressures to thirty pounds, 250° F. This is made possible by the pressurized reservoir, which never has need to be opened.

The tool head 16 employs a pair of jaws that operate with cooperative shearing action as the jaws close with respect to each other. These jaws may include a stationary jaw 117 against which a moveable, pivoted jaw 118 performs its work. The stationary or moveable nature of the jaws may be determined with reference to the power cylinder, which in the disclosed embodiment is stationary. Hence, the stationary jaw is in a fixed relative position with respect to the power cylinder. The moveable jaw is acted upon by the power piston and, hence, moves with respect to the power cylinder. The moveable jaw is mounted to the tool head on a transverse pivot pin 119. Jaw 118 is biased toward open position by a jaw spring 120, while piston nose 88 defines the maximum limit of opening. The stationary jaw is attached to the tool head by a mounting screw 121 and is loaded into the tool head by bottoming the jaw against a stop pin 122. Thus, either jaw can be removed and replaced with accuracy and speed.

A cushioning and retaining means is associated with the tool head and may be attached to or associated with one of the jaws for receiving the workpiece between the cushioning means and the opposite jaw. As a first example, a leaf style of retainer spring 123, FIG. 1, is attached to the stationary jaw by a button head screw 124 and is spaced from the working face of the jaw in order to allow room for the spring to flex against the workpiece. In operation, the jaws close upon a workpiece, severing an end of the workpiece. The severed end then is held between the lower jaw and the spring 123 until the lower jaw is opened.

Figure 7:
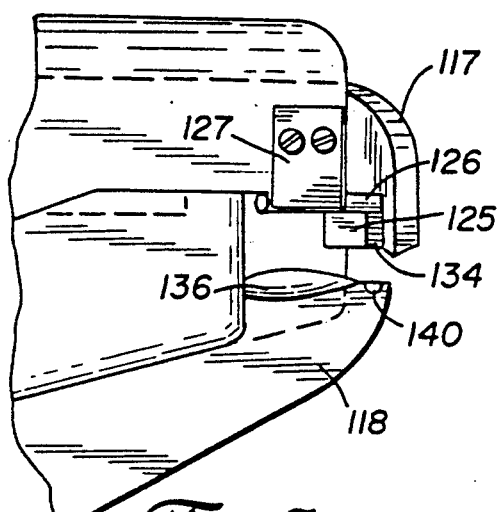
FIG. 7 is a detail side view of the tool head, showing another alternate embodiment.

As another, alternate embodiment of the cushioning and retaining means, a soft, malleable metal bar insert 125, FIG. 7, may be placed between the workpiece and the stationary jaw to serve as a deformable, disposable cushioning means. Aluminum is a suitable metal. The insert may have a trailing arm 126 that can be retained under a clip spring 127 attached to the side of the stationary jaw. This insert rests against the face of the stationary jaw as the jaws close on a workpiece. The workpiece is pushed against the soft metal of insert 125, deforming the insert. When the end of the workpiece is severed, the severed end is retained between the lower jaw and the insert. After each cut, the insert is discarded and another insert is clipped in place under spring 127.

Figure 6:
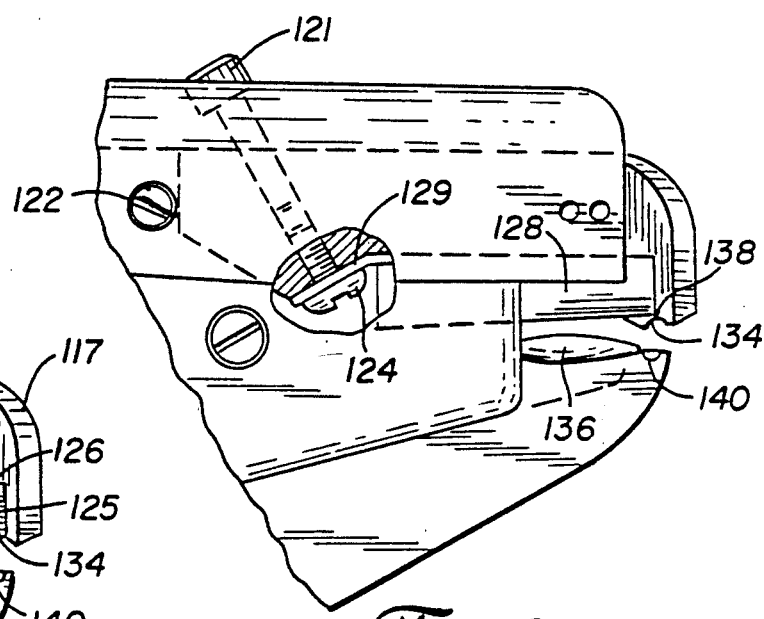
FIG. 6 is a detail side view of the tool head, showing an alternate embodiment.

Still another example of a cushioning means is a resilient block 128, FIG. 6, mounted to one of the jaws. Silicone rubber is a suitable material and is preferred to be mounted to the stationary jaw. A carrier wire 129 is inserted into the block to retain it, and the opposite end of the wire is formed into an eyelet and fastened to the tool head by screw 124. As the jaws close on the workpiece, the silicone block is compressed between the workpiece and the stationary jaw. The severed end of the workpiece is held against the silicone rubber block by the pivoted jaw 118. The silicone rubber block has the advantages of being reuseable and having a large surface area to hold the severed end. Any of the described types of cushions serve the functions of preventing the cutting action from snapping or shattering the workpiece and results in a very smooth, jar-free cutting action.

The pivoted jaw is in operative connection with the motor means via the hydraulic pump and the power piston to cause the jaw to pivot closed in response to forward motion of the piston. FIGS. 1 and 3 show that the spherical nose 88 of the power piston contacts a spherical seat 130 in the rear face of the pivoted jaw at an offset position from the pivot pin 119. An operative connection or contact between the power piston and jaw may include intermediate elements; for example followers, push rods, extensions, or saddles as may be required according to the design and selection of any particular tool head. However, the direct contact between the nose of the power piston and the pivoted jaw provides a mechanically simple mechanism that is economical to manufacture.

Notably, the piston head 80 is supported in the cylinder 64 by the flexible seal 86, which permits the piston head to tilt within the cylinder. As jaw seat 130 moves on the pivot pin 119, the seat moves off of the centerline of the power cylinder 64. Piston nose 88 moves off of the centerline with the seat 130, causing the piston head 80 to become tilted in the cylinder. The tilt is small, such as one or two degrees. The flexible seal 86 accommodates such a tilt, becoming eliptical within the cylinder when the piston head is moved out of perpendicular position with respect to the centerline of the cylinder.

In the cutting process, the power piston 88 advances against the rear end of the moveable jaw, urging the jaw to pivot on the pivot pin toward a closed position. The workpiece is pushed against the free end of the retaining spring 123, insert 125, block 128, or other cushioning means, which will hold the severed portion of the workpiece so as not to let it fly away. When the power piston is retracted, the jaw opens under the urging of spring 120.

Figure 2:
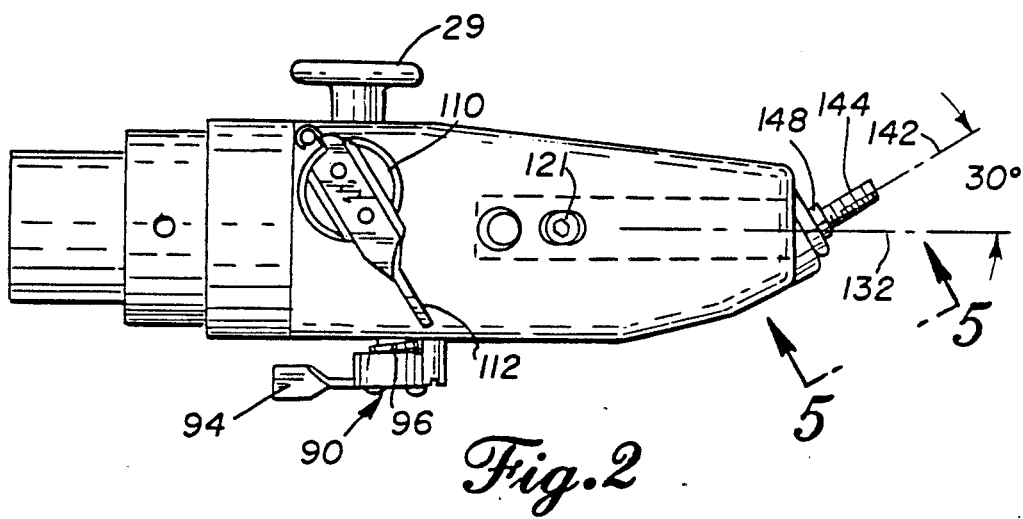
FIG. 2 is a top plan view of the hydraulic mechanism and tool head, showing a workpiece engaged in the tool head.

The illustrated jaws cut with a by-pass motion rather than a pincer motion. Specifically, the pivoted jaw 118 swings past the stationary jaw 117, producing a shearing motion. As best shown in FIGS. 2, the jaws extend from the front end of the tool in general alignment with a longitudinal axis 132 through the pump body, as well as through the drill motor. With reference to the position of the tool in FIG. 1, the stationary jaw 117 and the moveable jaw 118 generally lie in a longitudinal, vertical plane through axis 132.

The jaws may be configured to receive a workpiece having a generally anticipated size and shape. For this purpose, each has a workpiece-receiving seat or recess that is sized and shaped to accommodate a desired workpiece. The jaws receive and support the workpiece in a stable position while performing the shearing operation. For example, the upper jaw may have a semi-cylindrical seat 134 to receive the side of a stud or screw. In other embodiments, the upper jaw recess may be a cylindrical aperture through which the free end of the stud is axially inserted. The lower jaw also is configured to have a semi-cylindrical seat 136 for receiving the side edge of a stud workpiece.

The edges of the jaws approach each other in neighboring planes to cut a workpiece with shearing action. These edges may be termed the cutting edges. Cutting edge 138 of the stationary, upper jaw is at the rearward edge of seat 134 and forward of the cushioning means. Cutting edge 140 of the pivoted jaw is at the forward end of the jaw, with the seat 136 extending rearwardly from it. As best shown in FIG. 3, the seats together define a generally cylindrical receiving and guiding passage for the stud or screw and serve as a holder for the workpiece when the tool is in operation.

In the embodiment of the drawings, this cylindrical, workpiece receiving passage is laterally slanted so that the tool axis 132 is not parallel to a longitudinal axis 142 of the elongated stud or screw workpiece 144 when received in the passage. The tool can be slanted laterally from the axis of the workpiece by thirty degrees, as illustrated in FIG. 2, and not affect the cutting action. Accordingly, the cutting edges may have matching lateral bevels of thirty degrees, such as beveled front edge 146, FIG. 3, on the lower jaw. This slant provides a line of vision for the operator to view the workpiece during the engagement and cutting process. In addition, the slant allows the tool to approach the workpiece even in the confines of a surgical incision. It is contemplated that still other jaw designs could be developed to permit entry into tighter spaces.

The illustrated tool head is designed for use in orthopedic surgery, to trig off the extended end of screws or studs implanted in the bone. The pivoted knife action of this arrangement, together with the cushioning means, does not produce the jarring action of a pincer type of tool, which can loosen the stud in the bone. In the surgical operation, after such studs are tightened in the bone, plates are attached by conical nuts 148, FIG. 5. By modification of the tool head to crimp the studs instead of cut them, the stud can be crimped to keep the nut from working loose. All of these actions require high, internal hydraulic forces in the area of 5000 to 10,000 pounds. This tool is capable of producing those forces, and still larger forces at the cutting edges. The tooling is of heat treated tool steel and is capable of cutting high temper implant studs or rods of the S.S. 316-L type.

The pivot pin 119 is so positioned that a shearing angle can be incorporated to produce a holding force while the pivoted jaw follows the shear angle of the material being cut. Where a workpiece such as a screw or stud is received in the cylindrical seats 134, 136, the centerline of the workpiece lies in a plane, which generally is a horizontal plane through FIGS. 1, 5, 6, and 7. The previously described semi-cylindrical seat 134 and cylindrical guiding passage formed by the two seats 134, 136 and shown in FIG. 3 also has an axis lying in this horizontal plane. The centerline or pivot axis of pivot pin 119 also lies in the same plane or below it. With the pivot pin in this relationship to the jaw seat or seats, the cutting edge 140 of the pivoted jaw can follow the shear angle of the workpiece. Thus, the cutting edge 140 should pass through the cylindrical passage or workpiece while drawing rearwardly away from seat 134 on pivot pin 119 at least through a portion of the seat area, such as through the final half of the cylindrical passage and workpiece. This positioning of the pivot pin is termed as being in advance of the plane of the stationary jaw.

Figure 5:
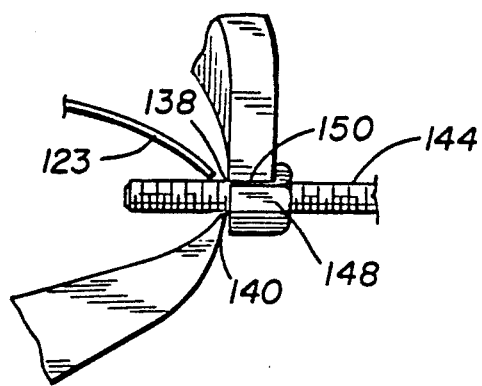
FIG. 5 is a detail view of the tool head, showing engagement with a workpiece in the jaws and taken perpendicularly to a longitudinal axis of the workpiece.

It is desirable to shear the studs 144 at the face of the conical nut 148. This task is difficult because the width of the nut itself typically blocks any style of cutting tool from clear access to the stud at the face of the nut. However, the present tool head can cleanly shear the stud at the nut face. To accomplish this type of cut, the seat in the forwardmost jaw, for example the stationary jaw, is adapted to receive the nut. With reference to FIG. 5, the workpiece-receiving seat 150 in the stationary jaw is given the profile of a segment of the skin of the inside surface of a torus, with a radius similar to that of the nut. The resulting seat 150 is termed a toroidal nest. This seat is generally semi-cylindrical in lateral profile, but also is dished in longitudinal profile. The other, rearwardmost jaw, for example the pivoted jaw, retains a seat similar in shape to the stud. With the two seats configured with such differently sized contours, the tool can operate to shear the stud against the nut, rather than using the cutting edge of the stationary jaw.

During the shearing operation, the nut is placed into the toroidal nest 150 with the face of the nut approximately parallel to the cutting edge 138. The toroidal shape of the recess 150 nests the nut into this desired position. As pivoted jaw 118 advances under the urging of the power piston, the forward face 146 and cutting edge 140 of this jaw swings generally along the plane of the nut face, serving a guiding and aligning function. The cutting edge 140 strikes the stud at the face of the nut and exerts shearing force. The opposite side of the nut is compressed against the toroidal nest and serves as a shearing die against which the pivoted jaw acts. As the pivoted jaw further advances, the pivoted jaw shears the stud across the face of the nut. The severed segment of the stud is retained and cushioned by the cushioning means, which, for clarity, has not been shown in FIG. 5. The resulting workpiece has no significant portion of the stud extending from the face of the nut, and the stud has been cut to have a flat end surface. The pivot pin 119 is in advance of the stationary jaw as previously described.

In the shearing process, the cushioning means is attached to one of the jaws and is desired to be located in the path of the workpiece-receiving seat of the opposite jaw. Thus, the cushioning means is attached to the stationary jaw, but is located in the path of seat 136 of the pivoted jaw. In addition, the undeformed shape or initial position of the cushioning means is such that it comes into contact with the workpiece before the jaws begin to sever the workpiece. Thus, the cushioning means will extend below the surface of seat 134. It is preferred that the cushioning means be attached to the stationary jaw when the tool is used in the disclosed manner, although the opposite arrangement may be suitable for other purposes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

I claim:

1. A power driven hand tool assembly, comprising:
  a motor means for providing rotational motion;
  a reservoir containing fluid and having an internal pressure source urging said fluid to move out of the reservoir, wherein said internal pressure source comprises a piston contained in the reservoir and moveable in a first direction toward the fluid, and a spring urging said piston to move in said first direction;
  a power cylinder containing a power piston that is moveable in first and second directions within the cylinder;
  a pump means having fluid contained therein, joined to said motor means for receiving the rotational motion therefrom and in response thereto imparting a condition of alternating relatively increased and decreased pressure to said fluid contained in the pump means; and
  valve means in communication with the fluid contained in the pump means for discharging a portion thereof in substantially one directional flow to said power cylinder on a first side of said power piston in response to said relative fluid pressure increase, and thereby moving the power piston in the first direction within the power cylinder, and said valve means in communication with the reservoir for receiving fluid under pressure therefrom in substantially one directional flow in response to said relative pressure decrease in the fluid contained in the pump means.

2. The power driven hand tool assembly of claim 1, further comprising:
  a power piston return means urging said power piston to move in the second direction within said power cylinder;
  a fluid release means for selectively establishing and disestablishing fluid communication between the power cylinder, on the first side of the power piston, and said reservoir; and
  wherein said power piston return means urgers the power piston to move in the second direction with greater pressure than the pressure with which said internal pressure source urges fluid to move out of the reservoir, thereby moving the power piston in the second direction, moving fluid out of the power cylinder, and moving fluid into the reservoir when said fluid release means establishes fluid communication between the power cylinder and the reservoir.

3. The power driven hand tool assembly of claim 1, further comprising:
  a tool head having first and second jaws moveable with respect to each other for, in use, acting upon a workpiece to sever it, wherein at least said first jaw is carried by the tool head on a pivoted mounting and is operatively contacted by said power piston for movement toward the second jaw for acting on a workpiece when the power piston moves in said first direction; and
  a cushioning means for, in use, cushioning the workpiece against jarring during severing action of the jaws thereon and for retaining the severed portion.

4. The power driven hand tool assembly of claim 3, wherein the second jaw of said tool head is stationary with respect to said power cylinder.

5. The power driven hand tool assembly of claim 3, wherein said cushioning means comprises a resilient member attached to one of said jaws in a position between the first and second jaws for, in use, being compressed by the workpiece as the jaws are acting upon the workpiece.

6. The power driven hand tool assembly of claim 3, wherein said cushioning means comprises a retainer spring attached to the tool head at one of said jaws and having a free end positioned to receive, in use, a workpiece between said free end of the opposite jaw.

7. The power driven hand tool assembly of claim 3, wherein said cushioning means comprises an insert of malleable, soft metal positioned between the jaws and in association with one of the jaws, defining a workpiece receiving area between the insert and the opposite jaw, such that, in use, the action of the opposite jaw against a workpiece compresses the insert between the workpiece and said one jaw as the two jaws move relatively closer to each other.

8. The power driven hand tool assembly of claim 3, wherein said cushioning means comprises a pad formed of a material having the flexible, resilient qualities of silicone rubber.

9. The power driven hand tool assembly of claim 3, further comprising:
  a tool head having first and second jaws moveable with respect to each other in response to movement of said power piston;
  said first jaw having a first-jaw workpiece-receiving seat;
  said second jaw having a second-jaw cutting edge that is positioned on the second jaw to move with respect to the first jaw along a path by-passing an end of the first-jaw workpiece-receiving seat with shearing action, thereby, in use, permitting a first portion of a workpiece to be supported in said first-jaw workpiece-receiving seat while a second portion of the workpiece is sheared by the action of the second-jaw cutting edge against the first portion of the workpiece.

10. The power driven hand tool assembly of claim 9, wherein said second jaw further comprises a second-jaw workpiece-receiving seat of a relatively smaller size than said first-jaw workpiece-receiving seat for, in use, supporting a second portion of the workpiece of smaller diameter than the first portion of the workpiece and permitting the smaller diameter portion to be sheared at the face of the larger diameter portion.

11. The power driven hand tool assembly of claim 10, wherein the surface of said first-jaw workpiece-receiving seat comprises a laterally and longitudinally concave nest.

12. The power driven hand tool assembly of claim 10, wherein the surface of said first-jaw workpiece-receiving set comprises a section of the skin of the inside surface of a torus.

13. The power driven hand tool assembly, comprising:
- a power cylinder containing a power piston that is moveable in first and second directions within the cylinder;
- a pump means having a fluid contained therein and connected to said power cylinder for supplying fluid to at least one side of said power piston to move the power piston in said first direction;
- a motor means connected to said pump means and causing the pump means to pump fluid to said one side of the power piston in response to operation of the motor means;
- a tool head having at least one moveable jaw carried on a pivot mounting, and the jaw having a spherical seat facing said power cylinder and located at a position offset from the pivot mounting and generally aligned with a centerline of the power cylinder;
- wherein said power piston has a spherical piston nose extending from the power cylinder generally in line with the centerline of the power cylinder, contacting said seat of the moveable jaw, and moving the jaw on said pivot mounting when the power piston moves in said first direction; and
- wherein the power piston is carried in the power cylinder on a flexible seal that is capable of sealing while being deformed by the tilting of said piston nose from the centerline of the power cylinder with movement of the moveable jaw on the pivot mounting.

14. A power driven hand tool assembly, comprising:
a motor means for providing driving force;
a tool head operatively connected to said motor means and having first and second jaws, wherein said first jaw is operatively connected to the motor means for moving the first jaw past said second jaw with shearing action by operation of the motor means to close the jaws;
the first jaw further comprising a first cutting edge facing the second jaw, and a first workpiece-receiving seat adjacent to said first cutting edge;
the second jaw further comprising a second cutting edge facing the first jaw, a second workpiece-receiving seat adjacent to said second cutting edge, and a workpiece cushioning means carried near said second workpiece receiving seat and substantially in line with the path of the first workpiece receiving seat for, in use while a workpiece is being sheared by the closing action of the jaws, retaining a severed portion of a workpiece in the first workpiece-receiving seat while a further portion of the workpiece is in the second workpiece-receiving seat; and
wherein said first and second jaws lie in a common plane and said first and second workpiece receiving seats are alignable along a common axis that is non-parallel to the plane of the jaws, such that in use the tool assembly is held at an angle to the workpiece, providing a lateral line of vision to the workpiece.

15. The power driven hand tool assembly of claim 14, wherein:
said first jaw is pivotally mounted for movement toward said second jaw about a pivot axis; and
the pivot axis of the first jaw is positioned in advance of the plane of the second jaw such that said first cutting edge is pivoted away from the second workpiece-receiving seat while moving through at least a portion of the seat area.

* * * * *